United States Patent Office 3,381,041
Patented Apr. 30, 1968

3,381,041
PURIFICATION OF FLUORINATED COMPOUNDS
Yutaka Kometani, Sanda-shi, Tadahiko Sugino, Osaka-shi, and Yasuyoshi Furukawa, Osaka-fu, Japan, assignors to Daikin Kogyo Kabushiki Kaisha, Osaka-shi, Japan, a juridical person of Japan
No Drawing. Filed Mar. 15, 1965, Ser. No. 439,994
Claims priority, application Japan, Mar. 17, 1964, 39/14,556, 39/14,557
10 Claims. (Cl. 260—653)

ABSTRACT OF THE DISCLOSURE

Process for purifying an impure fluorinated compound selected from the group consisting of an impure fluorinated alkane of from 1 to 9 carbon atoms selected from the group consisting of fluorinated alkanes consisting of carbon and fluorine and fluorinated alkanes consisting of carbon, fluorine and at least one member of the group consisting of hydrogen, chlorine, bromine and iodine and an impure perfluorinated alkene of from 2 to 9 carbon atoms, each of which contains as impurity at least one halogenated alkene of from 2 to 9 carbon atoms, said halogenated alkene consisting of carbon and at least one member of the group consisting of hydrogen, chlorine, bromine, iodine and fluorine and having at least one member of the group consisting of hydrogen, chlorine, bromine and iodine bonded to at least one carbon atom of the double bond, which process comprises contacting at from 0° to 150° C. for from 10 seconds to 30 minutes the impure fluorinated compound with a mixture of sulfuric acid of at least 50 percent by weight concentration and at least one member of the group consisting of mercury and mercury compounds in the order of from 0.1 to 20 percent by weight per sulfuric acid content in the mixture, and separating the purified fluorinated hydrocarbon from said sulfuric acid-mercury material mixture.

This invention relates to the purification of fluorinated compounds and more particularly to a process for purifying fluorinated alkanes or perfluorinated alkenes.

Fluorinated alkanes or perfluorinated alkenes contain various halogenated alkenes as impurities, which impurities are formed in the manufacture of the fluorinated alkanes or of the perfluorinated alkenes and have at least one member of the group consisting of hydrogen, chlorine, bromine and iodine bonded to at least one carbon atom of a double bond in the molecule. These impurities greatly impair the uses of the fluorinated alkanes and perfluorinated alkenes. When the fluorinated alkanes contain aforesaid impurities, for instance, the uses of the compounds will be restricted because of the toxicity, corrosiveness and the like harmful properties of the impurities. Further when said impurities are contained in tetrafluoroethylene, for instance, the properties, particularly heat resistance, of polytetrafluoroethylene derived therefrom are adversely affected.

Some of these impurities resemble the fluorinated alkanes or perfluorinated alkenes to be purified in their boiling point, making it impossible to eliminate the impurities therefrom by rectification. The processes for removing such impurities from the fluorinated alkanes or perfluorinated alkenes, which were indicated in the prior art, have been of low efficiency of purification or not commercially practicable. For instance, some of the prior processes fail to obtain the required purity of products in high order of yield, and others are inefficient and require impractically long and costly procedures.

An object of this invention is accordingly to provide a high order of purity of fluorinated alkanes and perfluorinated alkenes, particularly a high purity of fluorinated alkanes which are free from the toxicity and other harmful properties derived from the impurities, and a high purity of perfluorinated alkenes from which, for instance, a fluorine-containing resin which is markedly excellent in various properties, such as heat resistance, is derived.

Another object of this invention is to provide a purification process by which a high purity of fluorinated alkanes or perfluorinated alkenes can be obtained in a high order of yield by virtue of efficient elimination of the impurities alone.

A further object of this invention is to provide a process for purifying fluorinated alkanes or perfluorinated alkenes which is commercially practicable on account of efficient elimination of the impurities by a simplified procedure.

Other objects and advantages of this invention will become apparent hereinafter.

These objects of this invention are accomplished by contacting an impure fluorinated alkane of from 1 to 9 carbon atoms or an impure perfluorinated alkene of from 2 to 9 carbon atoms with sulfuric acid or a mixture of sulfuric acid and at least one mercury material selected from the group consisting of mercury and mercury compounds, and separating the purified compound from said sulfuric acid or a sulfuric acid-mercury material mixture.

Throughout the specification and claims, the term "mercury material" as used herein, is intended to include mercury and inorganic or organic compounds thereof, such as mercuric oxide, mercuric chloride, mercuric iodide, mercurous sulfate, mercuric sulfate, mercurous nitrate, mercuric nitrate, mercurous acetate, mercurous caprylate, mercurous benzoate, and mercurous cyclohexylcarboxylate.

In the present invention, sulfuric acid is employed for the purification of fluorinated alkanes, while a sulfuric acid-mercury material mixture is employed for the purification of fluorinated alkanes and perfluorinated alkenes.

The fluorinated alkanes having from 1 to 9 carbon atoms to be purified in accord with this invention include those compounds comprising carbon and fluorine, or carbon, fluorine and at least one member of hydrogen, chlorine, bromine, and iodine. Representative compounds are chlorodifluoromethane, dichlorofluoromethane, dichlorodifluoromethane, 1,1,2-trichloro-1,2,2-trifluoroethane,1,1-dichloro-1,1,2,2-tetrafluoroethane, hexafluoroethane, 1,2-dichloroperfluorobutane, $CF_3(CF_2)_4CH_2Cl$, and

$(CF_3)_2CH(CCl_2)_2CH(CF_3)_2$

The fluorinated alkenes having from 2 to 9 carbon atoms to be purified in accord with this invention are those compounds which comprise carbon and fluorine, and representative of the compounds are tetrafluoroethylene, hexafluoropropene, octafluorobutene, perfluorocyclobutene, perfluorooctene and perfluornonene.

By the term "impure" used for said fluorinated alkanes or perfluorinated alkenes is meant that the fluorinated alkanes or perfluorinated alkenes contain as impurities at least one member of halogenated alkenes of from 2 to 9 carbon atoms having at least one member of hydrogen, chlorine, bromine and iodine bonded to at least one carbon atom of double bond in the molecule. Representatives of the compounds are those of vinyl fluoride, vinylidene fluoride, trifluoroethylene, vinyl chloride, vinylidene chloride, 1,1 - dichloro - 2,2 -difluoroethylene, 1,1,6-trihydroperfluorohexene-1, 1,1,4-trihydro-2-methylperfluoroheptene - 1, 1,2 - dichloro-3-hydro-4-methylperfluoropentene-3, and 1,1-dihydroperfluorononene. These impurities are contained in fluorinated alkanes or perfluorinated alkenes as by-products or as unconverted reactants in the preparation of the fluorinated alkanes or of the perfluorinated alkenes, or for some other reasons. When trichlorotrifluoroethane is manufactured from tetrachloroethylene, for instance, the unreacted tetrachloroethylene and various by-product halogenated alkenes, such as dichlorodifluoroethylene and trichloroethylene, are inevitably contained as impurities. When tetrafluoroethylene is prepared by pyrolysis of chlorodifluoromethane, for instance, the product contains as the impurities various halogenated alkenes, such as trifluoroethylene, which is impossible to separate from tetrafluoroethylene by rectification because the boiling point thereof is in vicinity of that of tetrafluoroethylene.

The impure fluorinated alkanes or perfluorinated alkenes, which are treated and purified in accord with the present invention, are in gaseous or liquid state at normal room temperature, and the process of this invention can be applied to any of the above states.

In the present invention, sulfuric acid or a mixture of sulfuric acid and one or more species of mercury material is employed as a purifying reagent. In either case, the concentration of sulfuric acid should be at least 50 weight percent, and a concentration of the order of from 80 to 98 weight percent of sulfuric acid being particularly desirable. The best results are obtained by the employment of a sulfuric acid-mercury material mixture. Namely, the addition of mercury material to sulfuric acid markedly increases the efficiency of eliminating the impurities and leads to a yield of a still higher purity of the fluorinated alkanes and of the perfluorinated alkenes, because of multiple action or potentiation of sulfuric acid and the mercury material. The amount of mercury material in the order of 0.1 percent by weight per sulfuric acid content in the mixture is sufficient to display the excellent effect, and the amount thereof exceeding 20 percent by weight will be disadvantageous in the economical point of view and not exhibit any better effect. The desirable amount ranges from 0.5 to 5 percent by weight per sulfuric acid content.

In order to avoid unnecessary confusion, sulfuric acid employed for purifying the fluorinated alkanes and a sulfuric acid-mercury material mixture employed for purifying the fluorinated alkanes and perfluorinated alkenes are described as "purifying reagent" or "reagent" hereinafter, except where the description of sulfuric acid or a sulfuric acid-mercury material mixture is necessary. Further for the same reason, the fluorinated alkane and the perfluorinated alkene to be purified are described as "fluorinated compound" hereinafter, except where unnecessary.

According to the present invention, the purification of the fluorinated compounds in the presence of a purifying reagent as mentioned above is performed in a gas-liquid phase or liquid-liquid phase in a continuous or batch system.

In the gas-liquid phase the impure fluorinated compounds will form a gas phase while the purifying reagent will form a liquid phase. The impure fluorinated compound gas is bubbled in purifying reagent through a suitable device, such as a packed tube or a multipore tube or plate, or is continuously contacted with the reagent by counter-current. The temperature range for the gas-liquid phase treatment may be a temperature higher than the boiling point of the fluorinated hydrocarbon to be treated. Too high a temperature, however, is liable to cause a considerable amount of loss of the fluorinated compound, it being generally desirable to maintain the temperature under 150° C. The temperature should be properly selected according to the species of the fluorinated compounds to be treated, but in general should range between 0° C. and 150° C., most desirably 20° C. and 100° C. The contact time should be 10 seconds to 30 minutes, most desirably 30 seconds to 10 minutes. Hence the treatment may be carried out under normal, increased or reduced pressure, but normal atmospheric pressure is preferred from the economical point of view.

The treated gas usually contains a slight amount of sulfuric acid and may be washed with water and then dried and if necessary to further separate other impurities, subjected to fractional distillation. Drying is performed, for instance, by introducing the product into a tube containing a drying agent such as silica gel or anhydrous calcium sulfate.

When treating in liquid-liquid phase, the fluorinated compounds to be treated and purifying reagent are mixed with agitation for 10 seconds to 30 minutes, preferably 30 seconds to 10 minutes or thereabout. The treating temperature below the boiling points of the fluorinated compounds to be treated is suitable, generally 0° C. to 150° C., most desirably 20° C. to 100° C. When a temperature higher than the boiling point of the fluorinated compound is employed for the liquid-liquid phase treatment, an autoclave or other airtight container should be employed so as to treat under the generated pressure. The relative amounts of the fluorinated hydrocarbon and purifying reagent is not critical and may be properly selected from a wide range depending on the amount of impurities contained in the fluorinated compounds.

The fluorinated compounds purified in a liquid-liquid phase are separated from the reagent by various conventional methods, such as by means of a separating funnel, then washed with water and dried, and if further necessary to eliminate other impurities, fractionally distilled.

For the better understanding of the specific features of this invention, are shown in following Table 1 the results of tests pertaining to the apparent rates of absorption at 20° C. and 100° C. of the fluorinated alkanes in the presence of sulfuric acids at various concentration respectively in comparison with the results pertaining to halogenated alkenes.

The method of the tests consisted in placing 300 grams of sulfuric acid of desired concentration in a 500 cc., airtight, four-necked flask equipped with a mecury manometer and an agitator, and after elimination of air in the flask, the sample being introduced through another neck into the space in the flask at the flow rate of 60 cc./sec., while the acid was being stirred, until the pressure in flask was recovered to 760 mm./Hg., and from the curve showing the subsequent changes of pressure the apparent rates of absorption (mm. Hg/min.) were determined.

In the case of chlorodifluoromethane, however, some drop of pressure was observed due to partial dissolution of the substance, but after 30 minutes from the introduction, there was no further changes in pressure to be observed. In the following table apparent rates of absorption for chlorodifluoromethane was taken after the lapse of 30 minutes.

TABLE 1.—APPARENT RATE OF ABSORPTION
[mm. Hg/min.]

| Temperature (° C.) | Concentration of sulfric acid (wt. percent) | Chlorodifluoromethane | 1,1,2-trichloro-1,2,2-trifluoro- | Trifluorochloroethylene | Vinylidene fluoride | 1,1-dichloro-2,2-difluoroethylene |
|---|---|---|---|---|---|---|
| 20 | 90 | 0 | --- | 3 | --- | --- |
| 20 | 95 | 0 | --- | 7 | 410 | --- |
| 20 | 98 | 0 | --- | 12 | 540 | --- |
| 100 | 90 | 0 | --- | 8 | --- | --- |
| 100 | 95 | 0 | 0 | 33 | 1,500 | 51 |
| 100 | 98 | 0 | --- | 60 | 4,620 | --- |

From the above results, it is evident that fluorinated alkanes such as chlorodifluoromethane and 1,1,2-trichloro-1,2,2-trifluoroethane are not absorbed by sulfuric acid, while only those halogenated alkenes, such as trifluorochloroethylene, vinylidene fluoride and dichlorodifluoroethylene, having at least one member of hydrogen, chlorine, bromine and iodine having bonded to at least one carbon atom of a double bond in the molecule are efficiently absorbed by sulfuric acid.

Table 2 shows the results of tests designed to show a comparison of treatments with a mixture of sulfuric acid and mercurous sulfate, and that by single employment of mercurous sulfate. For the former 6.1 grams of mercurous sulfate was added to 300 grams of sulfuric acid of 95 weight percent concentrations, while in the latter case mercurous sulfate was employed in the form of 2 percent by weight aqueous dispersion. The tests were performed at 20° C. in the same manner as described for the tests of Table 1.

TABLE 2.—APPARENT RATE OF ABSORPTION
[mm. Hg/min.]

|  | Chlorodifluoromethane | Tetrafluoroethylene | Trifluoroethylene | Vinylidene fluoride |
| --- | --- | --- | --- | --- |
| $H_2SO_4$-$Hg_2SO_4$ | 0 | 0 | 35 | 990 |
| $Hg_2SO_4$ | 0 | 0 | 2 | 5 |

From the above results it is evident that while sulfuric acids containing mercury materials do not absorb the fluorinated alkanes and perfluorinated alkenes, they do absorb on the other hand the impurities comprising halogenated alkenes such as trifluoroethylene and vinylidene fluoride with a markedly higher efficiency than in the case of employing a mercury material alone. Further, the rate of absorbing the impurities is, compared with the rate shown in Table 1 in which sulfuric acid is employed alone, in a markedly higher order, and this fact indicates that the sulfuric acid and mercury material mixture bring a potentiation in absorbing the impurities.

Further, for the better understanding of this invention examples of this invention are given below, which are illustrative only and do not limit the scope of this invention.

EXAMPLE 1

In an iron cylinder, 5 cm. inner diameter and 200 cm. long, filled with Raschig rings and equipped with a heating steam jacket on the outside periphery were placed 2 liters of sulfuric acid of 95 weight percent concentration, and the interior temperature was maintained at 100° C., and 100 grams of chlorodifluoromethane containing 500 p.p.m. of trifluoroethylene were bubbled through the bottom of the cylinder at the rate of 300 milliliters/min.

The gas from the top of the cylinder was bubbled into the water tank, to be washed, then passed into the drying tube filled with silica gel, to be dried. By this purification process were obtained 98 grams of purified chlorodifluoromethane, and by an infrared absorption spectrum analysis were found only 45 p.p.m. of trifluoroethylene contained therein.

EXAMPLE 2

In an airtight autoclave of shaking type with the outside periphery covered with a steam jacket was placed 1 liter of $H_2SO_4$ (95%) and 40 grams of 1,1,2-trichloro-1,2,2-trifluoroethane containing 1,000 p.p.m. of 1,1-dichloro-2,2-difluoroethylene and the mixture was shaken at 100° C. for 5 minutes. After cooling to a room temperature, the mixture was introduced to the separating funnel through the bottom of the autoclave where the lower layer of sulfuric acid was removed. Then the residue was washed with water by shaking, dried by admixing silica gel, and filtrated. The resultant purified trichlorotrifluoroethylene was found to contain only 15 p.p.m. of dichlorodifluoromethane by an infrared absorption spectrum analysis.

EXAMPLE 3

In an airtight autoclave of shaking type covered with a steam jacket were placed a mixture of 37 grams of mercurous sulfate and 1 liter of sulfuric acid (95%), and 40 grams of chlorodifluoromethane containing 500 p.p.m. of trifluoroethylene, and the mixture was shaken at 20° C. for 5 minutes. Separation, washing with water and drying were performed in the same manner as Example 1.

The resultant purified chlorodifluoromethane was found by an infrared absorbtion spectrum analysis to contain only 65 p.p.m. of trifluoroethylene.

For the sake of comparison, 40 grams of chlorodifluoromethane containing 500 p.p.m. of trifluoroethylene was treated with 1,000 grams of aqueous dispersion containing 37 grams of mercurous sulfate in the same autoclave under the same conditions as employed and described above in this example. The resultant chlorodifluoromethane was found to contain 350 p.p.m. of trifluoroethylene by an infrared absorption spectrum analysis.

EXAMPLE 4

50 grams of 1,1,2-trichloro-1,2,2-trifluoroethane containing 1,1-dichloro-2,2-difluoroethylene in the order of 0.5 percent by weight was treated with a mixture of 1,000 milliliters of sulfuric acid of 95 weight percent concentration and 50 grams of mercuric chloride in the same autoclave under same conditions as employed and described in Example 3.

The resultant purified 1,1,2-trichloro-1,2,2-trifluoroethane was found by an infrared absorption spectrum analysis to contain dichlorodifluoroethylene in the order of only 0.02 weight percent.

EXAMPLE 5

In an iron cylinder described as in Example 1 was placed a mixture of 2 liters of sulfuric acid of 95 weight percent concentration and 50 grams of mercurous acetate, and interior temperature was maintained at 20° C., and tetrafluoroethylene containing 90 p.p.m. of vinylidene fluoride were bubbled through the bottom of the cylinder at the rate of 300 milliliters/min. After washing and drying in the same manner as described in Example 1, the resultant purified tetrafluoroethylene was found to contain no trace of vinylidene fluoride by an infrared absorption spectrum analysis.

We claim:

1. A process for purifying an impure fluorinated compound selected from the group consisting of
   an impure fluorinated alkane containing 1 to 9 carbon atoms and selected from the group consisting of fluorinated alkanes consisting of carbon and fluorine and fluorinated alkanes consisting of carbon, fluorine and at least one member of the group consisting of hydrogen, chlorine, bromine and iodine, and
   an impure perfluorinated alkene containing 2 to 9 carbon atoms,
   said impure fluorinated compound containing as an impurity at least one halogenated alkene selected from the group consisting of vinyl fluoride, vinylidene fluoride, trifluoroethylene, vinyl chloride, vinylidene chloride, 1,1-dichloro-2,2-difluoroethylene, 1,1,6-trihydroperfluorohexene-1, 1,1,4-trihydro-2-methyl perfluoroheptane - 1,1,2 - dichloro-3-hydro-4-methyl perfluoropentene-3 and 1,1-dihydroperfluorononene,
   which comprises
   contacting said impure fluorinated compound, at about 0° to 150° C. and for about 10 seconds to 30 minutes, with a mixture of sulfuric acid, of at least 50 percent by weight concentration, and at least one mercury material, in the order of from 0.1 to 20 percent by weight of the sulfuric acid content of said mixture,
   said mercury material being selected from the group consisting of mercury, mercuric oxide, mercuric chloride, mercuric iodide, mercurous sulfate, mercuric sulfate, mercurous nitrate, mercuric nitrate, mercurous acetate, mercurous caprylate, mercurous benzoate and mercurous cyclohexyl carboxylate, and
   separating the resulting purified fluorinated compound from said sulfuric acid-mercury material mixture.

2. The process of claim 1, in which said impure fluorinated compound is chlorodifluoromethane containing trifluoroethylene as a main impurity.

3. The process of claim 1, in which said impure fluorinated compound is 1,1,2-trichloro-1,2,2-trifluoroethane containing 1,1-dichloro-2,2-difluoroethylene as a main impurity.

4. The process of claim 1, in which said fluorinated compound is tetrafluoroethylene containing vinylidene fluoride as a main impurity.

5. The process of claim 1, in which the concentration of sulfuric acid is in the range of from 80 to 98 weight percent.

6. The process of claim 1, in which said mercury material is mercurous sulfate.

7. The process of claim 1, in which said sulfuric acid-mercury material mixture contains the mercury material in the order of from 0.5 to 5 percent by weight of the sulfuric acid content in the mixture.

8. The process of claim 1, in which said temperature is in the range of from 20° to 100° C.

9. The process of claim 1 in which said mercury material is mercuric chloride.

10. The process of claim 1 in which said mercury material is mercurous acetate.

References Cited
UNITED STATES PATENTS 3,218,364   11/1965   Kometani et al. ____ 260—653.3

DANIEL D. HORWITZ, *Primary Examiner.*

LEON ZITVER, *Examiner.*